United States Patent [19]

Nagashima

[11] Patent Number: 5,661,654

[45] Date of Patent: Aug. 26, 1997

[54] METHOD OF CORRECTING ERROR IN MOUNTING WORKPIECE AND APPARATUS THEREFOR

[75] Inventor: Kazuo Nagashima, Shizuoka-ken, Japan

[73] Assignee: Toshiba Kikai Kabushiki Kaisha, Tokyo-to, Japan

[21] Appl. No.: 430,841

[22] Filed: Apr. 28, 1995

[30] Foreign Application Priority Data

Apr. 28, 1994 [JP] Japan .................................. 6-092470

[51] Int. Cl.$^6$ .................................................. G05B 19/404
[52] U.S. Cl. ............... 364/474.18; 318/572; 364/474.34; 364/474.35
[58] Field of Search ........................ 364/474.28, 474.16, 364/474.17, 474.18, 474.34, 474.35, 474.36, 474.37; 318/572

[56] References Cited

U.S. PATENT DOCUMENTS

| | | | |
|---|---|---|---|
| 3,633,011 | 1/1972 | Bederman et al. | 364/474.34 |
| 4,590,578 | 5/1986 | Barto, Jr. et al. | 364/474.34 X |
| 5,031,106 | 7/1991 | Tanahashi et al. | 364/474.28 |
| 5,111,406 | 5/1992 | Zachman et al. | 364/474.35 X |
| 5,309,646 | 5/1994 | Randolph, Jr. et al. | 364/474.18 X |

*Primary Examiner*—Joseph Ruggiero
*Attorney, Agent, or Firm*—Cushman Darby & Cushman IP Group of Pillsbury Madison & Sutro, LLP

[57] ABSTRACT

A method of correcting an error in mounting a workpiece includes a step of determining a position and a direction of a tool on a coordinate system of the workpiece on the basis of command numerical values, a step of correcting an error in a preset quantity in every direction, a step of obtaining quinaxial coordinate values satisfying the position and the direction of the tool as a result of performing the error correction and a step of giving a numerical control command to a driving unit of each axis on the basis of the quinaxial coordinate values. An apparatus for correcting an error in mounting a workpiece includes an attitude detecting unit, a correcting unit, a coordinate calculating unit and a command unit that correspond to those steps, respectively. The machining can be thereby effected by correcting mounting errors that are not confined to the three X-, Y- and Z-directional position parallel movements in simultaneous quinaxial control machining without requiring a machining program.

5 Claims, 7 Drawing Sheets

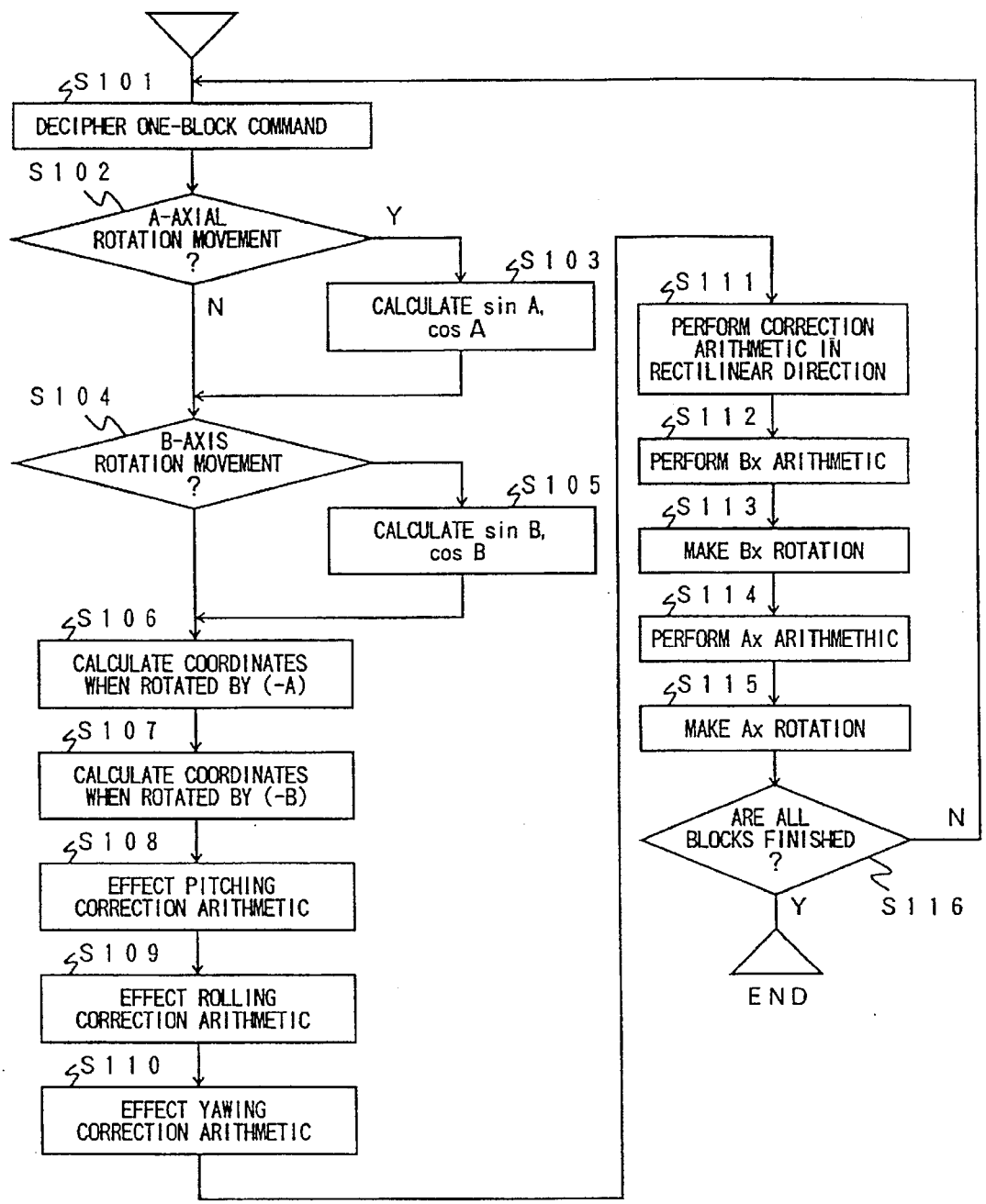
F I G. 8

METHOD OF CORRECTING ERROR IN MOUNTING WORKPIECE AND APPARATUS THEREFOR

BACKGROUND OF THE INVENTION

1. Field of the Invention

The present invention is related generally to a method and an apparatus for correcting a mounting error when mounting a workpiece to a machine tool by use of a fixture and more particularly to a method of and an apparatus for correcting a mounting error, which are suited to a simultaneous quinaxial controlled machine tool for working a configuration of the workpiece at a high degree of freedom, especially, a machine tool structured to have rotational control axes on the side of a workpiece table.

2. Description of Related Background Art

A fixture (jig) for fixing the workpiece is employed for facilitating machining by a machine tool. In this case, a mounting error (offset) of the workpiece is produced in the machine tool due to the use of the fixture, and it is therefore required that such a mounting error be corrected. This correction is known as an offset correction.

According to a conventionally employed fixture offset correcting method, a set offset quantity is corrected with respect to positions in three axial directions x, y, z. This offset correcting method is referred to as a simple fixture offset correcting method.

The offset quantity based on this method is given in the form of triaxial (X, Y, Z) vector quantities (ΔX, ΔY, ΔZ). A coordinate system of the offset vectors is based on directions on a mechanical coordinate system. For this reason, a correcting calculation is quite simple.

There arise, however, a variety of the following problems inherent in the simple fixture offset correcting method.

First, the mounting errors of the workpiece with respect to the fixture may be caused not only in the three directions X, Y, Z but also in three rotational degree-of-freedom directions, or yaw, roll and pitch. There exists, however, no correcting method coping therewith.

Second, when rotating the workpiece, x-, y- and z-axis directional positions shift, with the result that the direction of error vectors also change. Hence, the error can not be properly corrected with the same set value. The proper correction entails setting an offset numerical value at each angle by giving an offset vector corresponding to each angle every time rotary axes A, B are commanded. In this case, even a quinaxial machine tool, if cutting within that angle, performs correction by effecting the dividing, usable by previously calculating and setting offset vectors corresponding to all the dividing angles.

Third, the simple fixture offset correcting method is not usable under simultaneous quinaxial control wherein a rotating angle of the workpiece is changed during machining.

Consequently, a complete fixture offset correcting method is required which means that all six degree-of-freedom offsets be properly corrected. This method, however, presents problems, such as numerous variables making the arithmetic operation complicated and quick control impossible, and also requiring a part program to be rewritten.

SUMMARY OF THE INVENTION

Accordingly, it is a primary object of the present invention to provide a method and an apparatus for correcting an error in mounting a workpiece, which are capable of performing the machining by correcting the mounting errors not only in three X, Y- and Z-directional position parallel movements but also in the rotational directions of yaw, roll and pitch without requiring a machining program.

According to one aspect of the present invention, there is provided a method of correcting an error in mounting a workpiece in a numerical control device for performing simultaneous quinaxial control of the workpiece secured to a fixture, said method comprising:

a step of determining a position and a direction of a tool on a coordinate system of the workpiece on the basis of command numerical values;

a step of correcting an error in a preset quantity in every direction;

a step of obtaining quinaxial coordinate values satisfying the position and the direction of the tool as a result of performing the error correction; and a step of giving a numerical control command to driving means of each axis on the basis of the quinaxial coordinate values.

According to another aspect of the present invention, there is provided an apparatus for correcting an error in mounting a workpiece in a numerical control device for performing simultaneous quinaxial control of the workpiece secured to a fixture, said apparatus comprising:

attitude detecting means for determining a position and a direction of a tool on a coordinate system of the workpiece on the basis of command numerical values;

correcting means for correcting an error in a preset quantity in every direction;

coordinate calculating means for obtaining quinaxial coordinate values satisfying the position and the direction of the tool as a result of performing the error correction; and command means for giving a numerical control command to driving means of each axis on the basis of the quinaxial coordinate values.

According to the present invention, first, a position and a direction of a tool are determined on a workpiece coordinate system on the basis of command values, and the error in every direction is corrected. Thereafter, quinaxial coordinate values are obtained, and, on the basis of these coordinate values, a numerical control command is given to a driving unit of each axis. Hence, it is possible to perform the machining by correcting the mounting errors not only in the three X-, Y- and Z-directional position parallel movements but also in the rotating directions of yaw, roll and pitch.

BRIEF DESCRIPTION OF THE DRAWINGS

Other objects and advantages of the present invention will become apparent during the following discussion in conjunction with the accompanying drawings, in which:

FIG. 8 is a flowchart showing procedures of obtaining a correction quantity according to this invention.

DETAILED DESCRIPTION OF THE PREFERRED EMBODIMENTS

Figure 1:
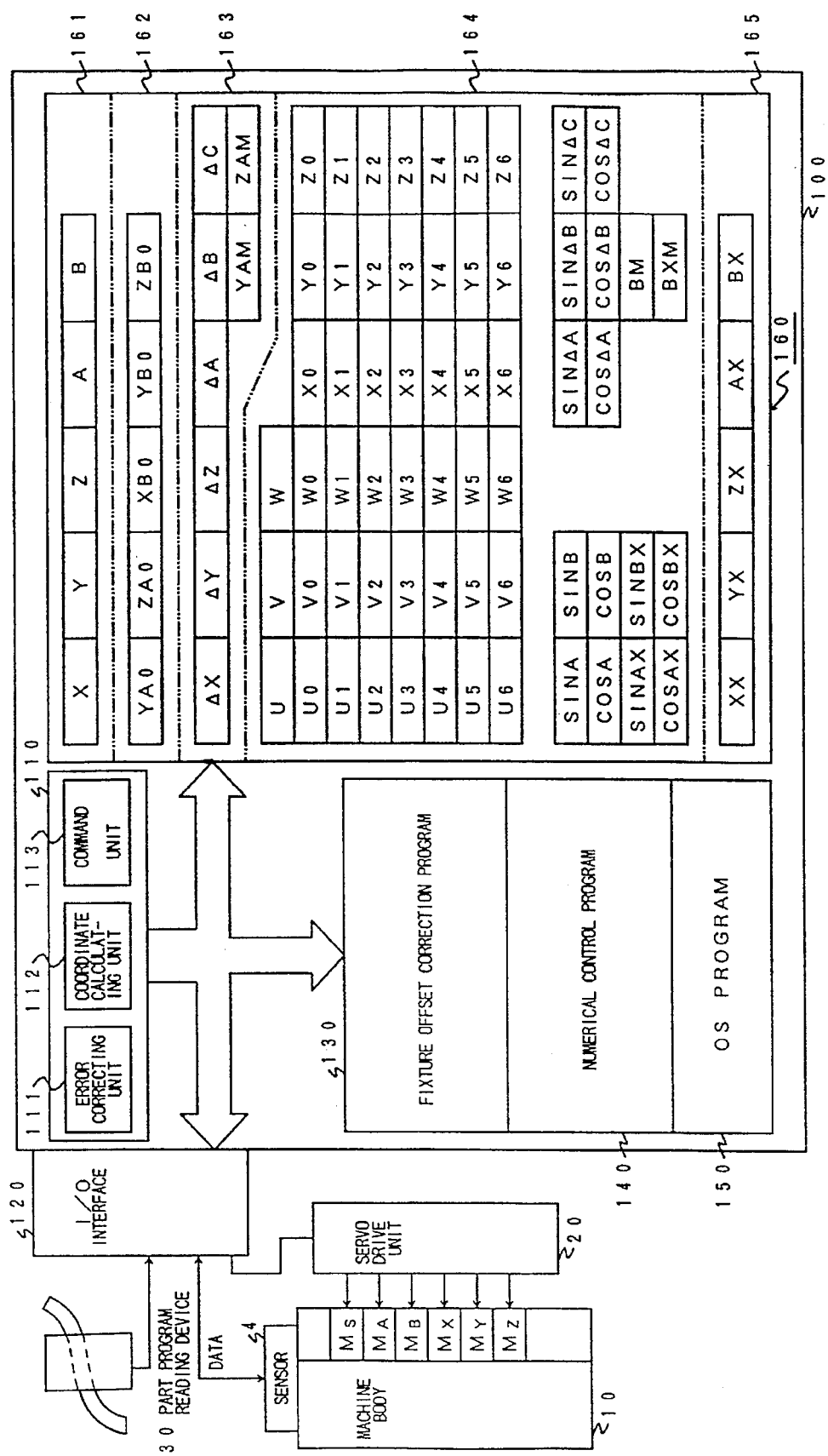
FIG. 1 is a block diagram illustrating a construction of a workpiece mounting error correcting apparatus according to the present invention.
Figure 2:
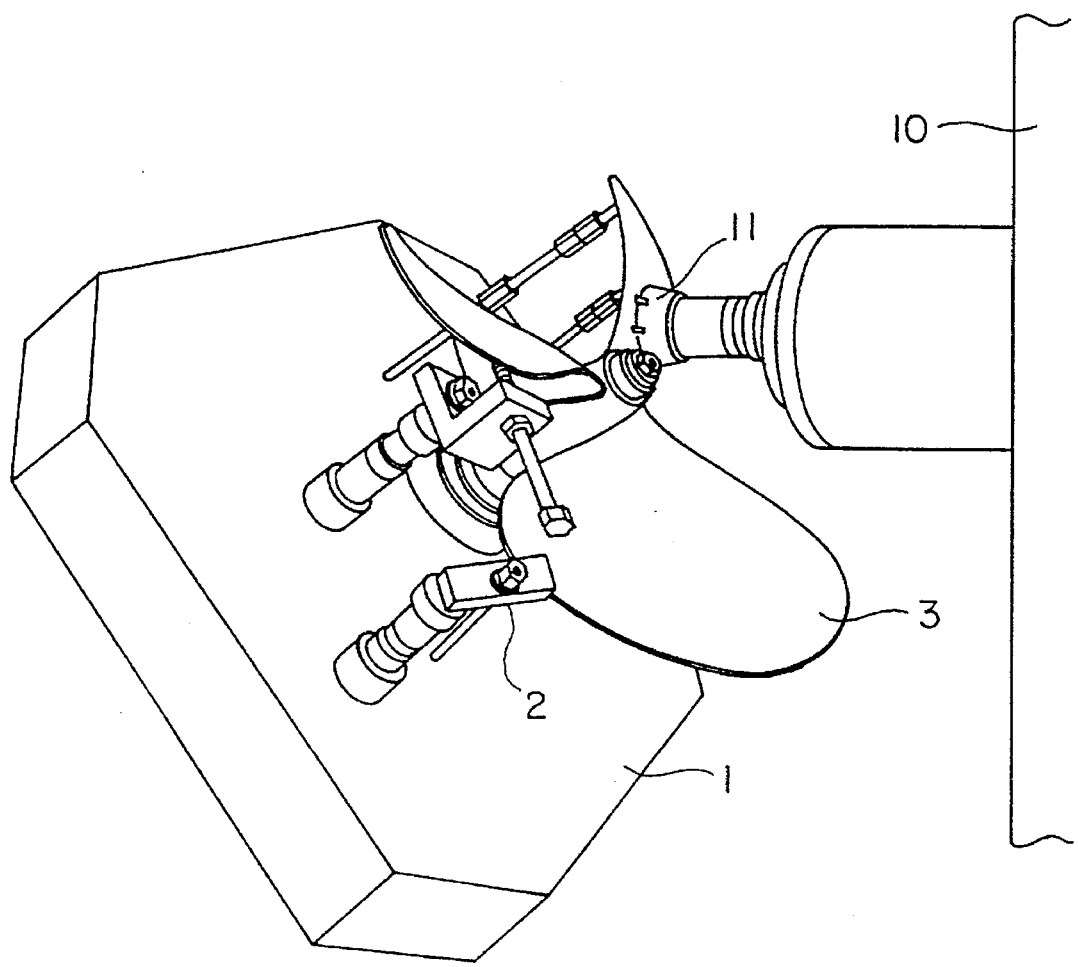
FIG. 2 is a perspective view illustrating how the workpiece is machined according to this invention.

FIG. 1 schematically illustrates a construction of an apparatus for correcting an error in mounting a workpiece according to the present invention. FIG. 2 shows how machining is carried out.

Herein, a screw for a ship is taken as a workpiece 3. This workpiece 3 is mounted to a fixture 1 through a mounting member 2. This fixture 1 is set with respect to a machine tool 10, and the workpiece is machined by a tool 11 such as an end mill, etc. This machine tool is controlled by a numerical control device 100 for simultaneously performing quinaxial control of the tool. More specifically, a command given by the numerical control device 100 is sent via an I/O interface 120 to servo drive unit 20 on the side of the machine tool. This servo drive unit 20 drives motors MS, MA, MB, MX, MY, MZ attached to the machine body 10. Provided further is a sensor 4 serving as an attitude detecting unit for determining a position and a direction of the tool in a coordinate system of the workpiece on the basis of a command numerical value. An item of detection data of the sensor 4 is taken in by the numerical control device 100 via the I/O interface 120.

The numerical control device 100 includes a CPU 110, the I/O interface 120, program memory units 130, 140, 150 and a memory unit 160 for storing respective items of data needed for a coordinate calculation which will be stated latter.

The CPU 110 executes a variety of functions under an OS program stored in the program memory unit 150. As a function actualizing unit related to the present invention, however, the CPU 110 comprises an error correcting unit 111 for effecting an error correction with a preset quantity in every direction by executing a fixture offset correction program stored in the program memory unit 130. The CPU 110 also comprises a coordinate calculation unit 112 for obtaining quinaxial coordinate values satisfying a tool position and a tool direction as a result of correcting the error. The CPU 110 further comprises a command unit 113 for giving a numerical control command to a driving unit of each axis on the basis of the quinaxial coordinate values by executing a numerical control program stored in the program memory unit 140.

The following is a detailed description of an offset correction in consideration of a rotating direction of the coordinate system of the workpiece which is employed in the present invention.

Figure 3:
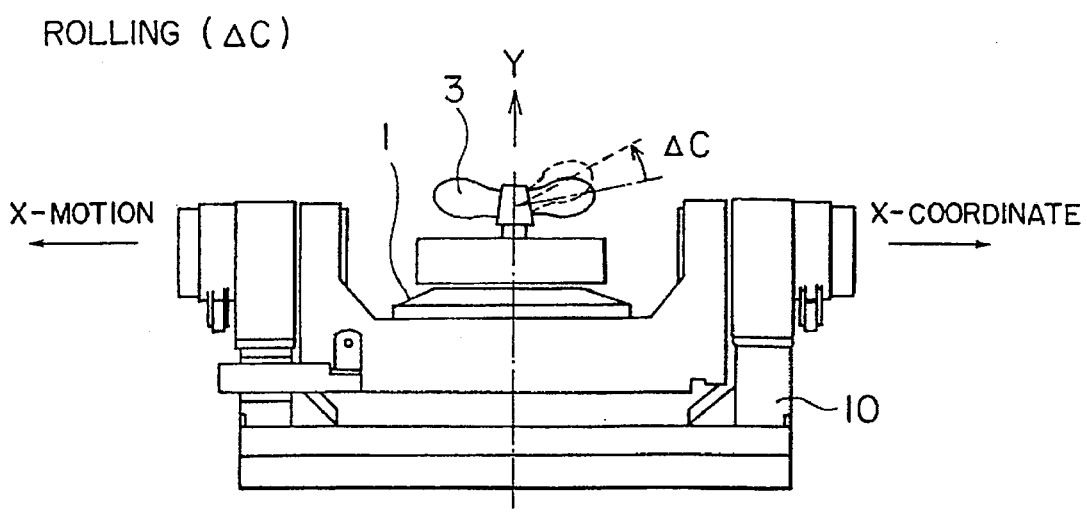
FIG. 3 is a front view of assistance in explaining roll.
Figure 4:
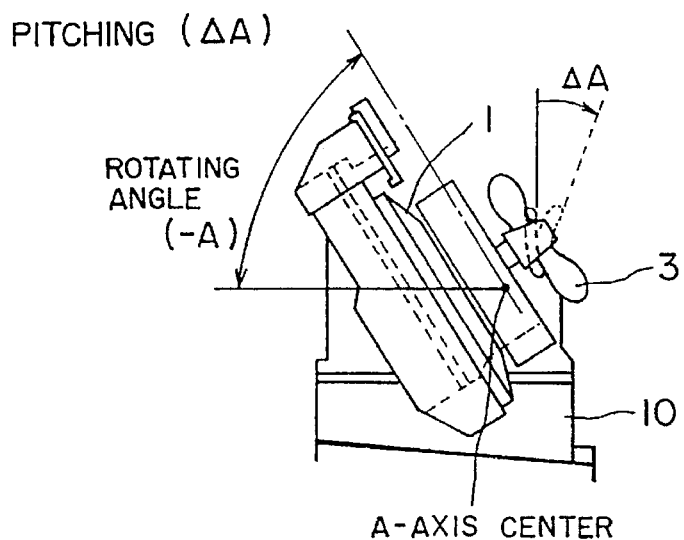
FIG. 4 is a side view of assistance in explaining pitch.

The explanation starts with roll, pitch and yaw. First, rolling is illustrated in FIG. 3, as movement in a back-and-forth direction of the axis (an error ΔC is given counterclockwise as viewed in a Z+direction). Pitching pitching is, as obvious from a side view of FIG. 4, a movement in right-and-left directions of the axis (an error ΔA is given opposite to a direction of a swivel base motion). Yawing is, as illustrated in a plan view FIG. 5, a movement in a rotating direction of the axis (an error ΔB is given opposite to a direction of a table motion).

Figure 5:
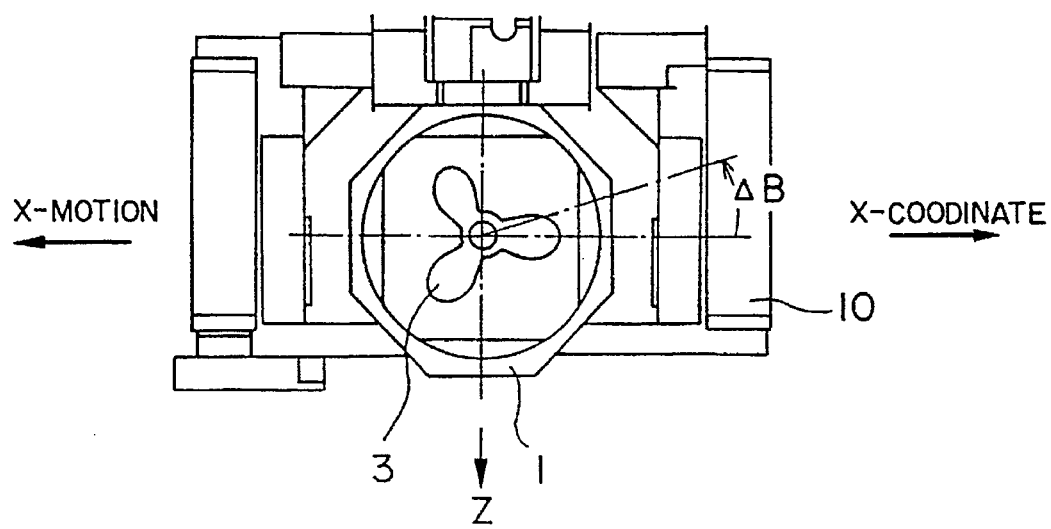
FIG. 5 is a plan view of assistance in explaining yaw.
Figure 6:
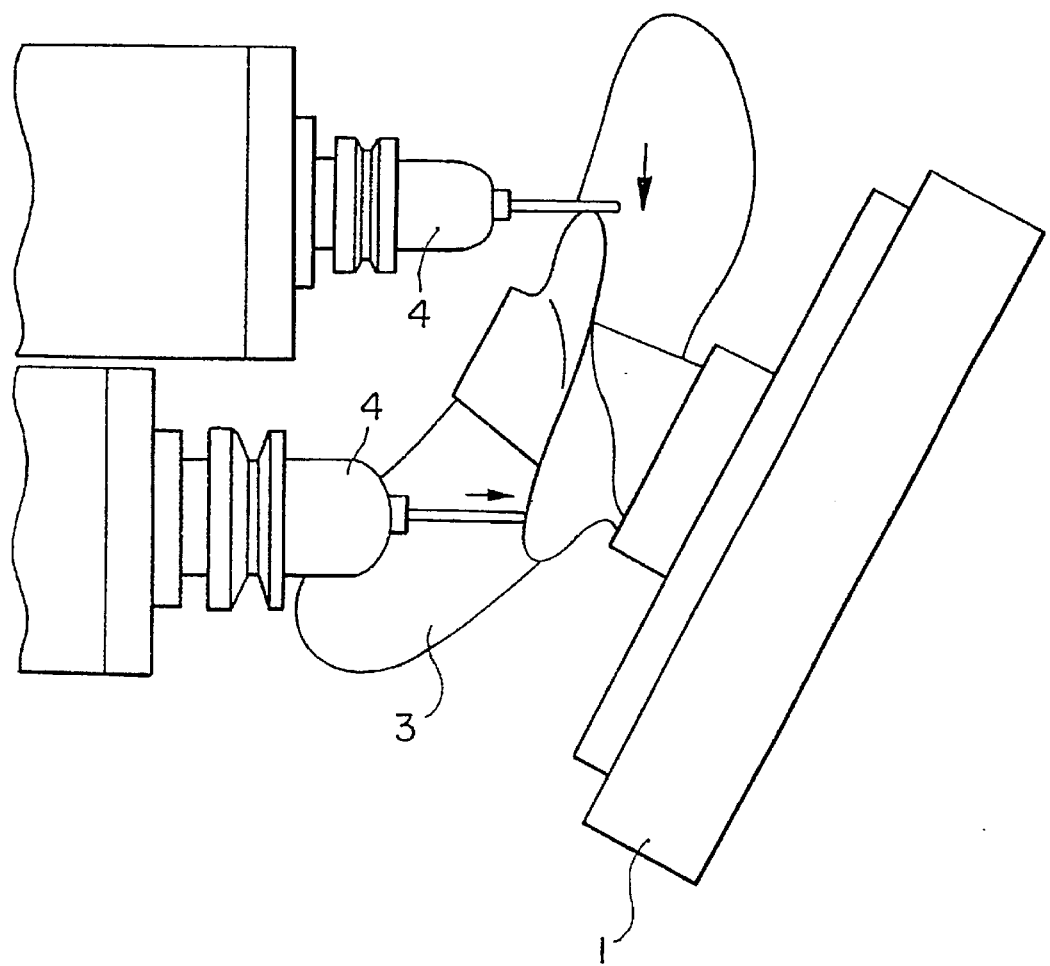
FIG. 6 is an explanatory view showing how positions of an edge of a workpiece and of a face surface are detected.
Figure 7:
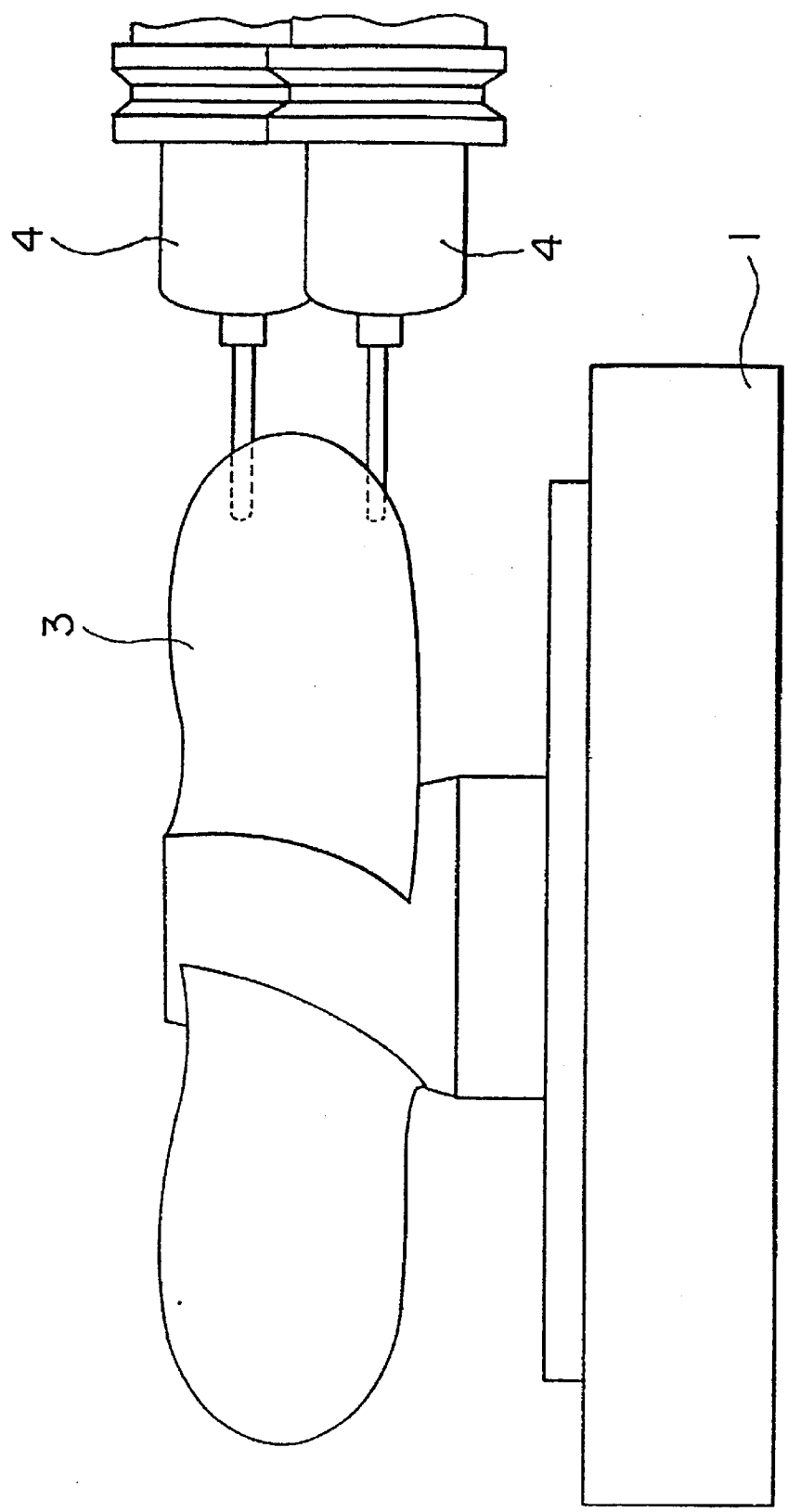
FIG. 7 is an explanatory view showing how a position of the rear surface of the workpiece is detected.

Further, a position of the workpiece is detected by the sensor 4 in the way as shown in the FIGS 5 and 7. FIG. 6 shows how a surface position of the screw is detected, while FIG. 7 illustrates how a rear surface position thereof is detected, respectively.

The present invention does not adopt a complete fixture offset correcting method capable of rightly correcting all the offsets of six degrees of freedom with respect to totally six-directional corrections, i.e. of position parallel movements in three directions (X, Y, Z) and of rotational movements in three rotation degree-of-freedom directions of yaw, the roll and pitch, but a definite fixture offset correcting method defined as a correcting method capable of making the correction with respect to the six degrees of freedom while being limited to triaxial offsets in rectilinear directions X, Y, Z.

The defined fixture offset correcting method will hereinafter be discussed.

A direction and a quantity of the mounting error of the workpiece with respect to a jig are given in the form of offset vectors (ΔX, ΔY, ΔZ) when each of rotational axes A, B is a zero angle. With respect to this angle, the following processing is carried out so that both the correction relative to a mechanical coordinate system and the correction pertaining to a program coordinate system can be effected in superposition.

First, only the axis B is rotated to keep a relationship of A=0. If the offset vectors (ΔX, 66 Y, ΔZ) become (ΔX1, ΔY1, ΔZ1) because of rotating about the axis B, (ΔX1, ΔY1, ΔZ1) are given by the following formulae:

$$\Delta X1 = \Delta X^* \cos(B) - \Delta Z^* \sin(B)$$

$$\Delta Y1 = \Delta Y$$

$$\Delta Z1 = \Delta X^* \sin(b) + \Delta Z^* \cos(B)$$

This implies that the offset vectors cause a change matrix to function as below.

$$\begin{bmatrix} \Delta X1 \\ \Delta Y1 \\ \Delta Z1 \end{bmatrix} = \begin{bmatrix} \cos(B), & 0, & -\sin(B) \\ 0, & 1, & 0 \\ \sin(B), & 0, & \cos(B) \end{bmatrix} \begin{bmatrix} \Delta X \\ \Delta Y \\ \Delta Z \end{bmatrix} \quad \text{[Formula 1]}$$

Next, the axis A is rotated while keeping the angle of the axis B. If the offset vectors (ΔX1, ΔY1, ΔZ1) become (ΔX2, ΔY2, ΔZ2) due to the rotation, (ΔX2, ΔY2, ΔZ2) are given by the following formulae:

$$\Delta X2 = \Delta X1$$

$$\Delta Y2 = -\Delta Y1^* \cos(A) + \Delta Z1^* \sin(A)$$

$$\Delta Z2 = -\Delta Y1^* \sin(A) + \Delta Z1^* \cos(A)$$

This implies that the offset vectors cause the change matrix to function as below:

$$\begin{bmatrix} \Delta X2 \\ \Delta Y2 \\ \Delta Z2 \end{bmatrix} = \begin{bmatrix} 1, & 0, & 0 \\ 0, & \cos(A), & \sin(A) \\ 0, & -\sin(A), & \cos(A) \end{bmatrix} \begin{bmatrix} \Delta X1 \\ \Delta Y1 \\ \Delta Z1 \end{bmatrix} \quad \text{[Formula 2]}$$

In the case of the simultaneous quinaxial control machining, the above vector converting calculation is performed per command block with respect to the given offset vectors (ΔX, ΔY, ΔZ). Command positions are corrected by only correction vectors (ΔX2, ΔY2, ΔZ2) obtained by this vector converting calculation, whereby a method of correction limited to only the rectilinear axial directions X, Y, Z is actualized.

Examined next is an outline of procedures needed for properly correcting an offset error of six degrees of freedom.

In such a calculation, the following points are required to be taken into consideration.

In the simultaneous quinaxial machining using a lateral (horizontal) machining center, numerical values of five axes of [X, Y, Z, A, B] are commanded. In this connection, a position of a cutting tool and a directional vector are expressed by six elements of [X, Y, Z, U, V, W], the cutting tool is, as viewed from the machine side, positioned at [X, Y, Z, 0, 0, 1] on a program coordinates.

For viewing it from the workpiece side, this is transformed into a mechanical coordinate system and further shifted to a coordinate system with the axes A, B centered. This rotation corresponding to (−A), and the position of the cutting tool and the directional vector at that time are given by [X1, Y1, Z1, U1, V1, W1].

Next, when rotated by (−B), the position of the cutting tool and the directional vector at that time are given by [X0, Y0, Z0, U0, V0, W0]. This position and the directional vector are those as viewed from the workpiece coordinate system when not offset.

The correction in the rectilinear direction, because of the correction effect being independent, does not depend on the sequence of the corrections, whereas the correction in the rotating direction depends on the correcting sequence. Now, the correcting sequence is determined as below:

ΔA: pitching correction,
ΔC: rolling correction,
ΔB: yawing correction, and
ΔXYZ: correction in the rectilinear direction.

Results of carrying out these corrections are obtained, and from these results, coordinates [Xx, Yx, Zx, Ax, Bx] on which the machine is to be actually operated are calculated, and a command is issued.

Next, the calculation of a correction quantity will be explained following the procedures. FIG. 8 is a flowchart showing arithmetic operations of the correction according to this invention.

To start with, a part program reading device 30 reads a part program and deciphers a 1-block command (step S101). These command values X, Y, Z, A, B are stored in an area 161 of a memory 160. Checked is whether or not there is a movement with respect to A (step S102). If moved, related sin and cos are obtained (step S103). Checked similarly is whether or not there is a movement with respect to B (step S104). If moved, related sines and cosines are obtained (step S105).

Sines and cosines obtained on this occasion are given as follows:

sin ΔA=sin (ΔA) cos ΔA=cos (ΔA)
sin ΔB=sin (ΔB) cos ΔB=cos (ΔB)
sin ΔC=sin (ΔC) cos ΔC=cos (ΔC)
sin A=sin (A) cos A=cos (A)
sin B=sin (B) cos B=cos (B)

Note that fixture offset values ΔX, ΔY, ΔZ, ΔA, ΔB, ΔC at this state are the values measured when mounting the object to be worked. The values are stored in the area 163 of the memory 160 and held until the machining is completed. Further, with respect to the fixture offset values, these input values are set as they are.

Also, the input numerical values can be set based on a gradient (tan) in addition to deg (degree) and rod (radian). A calculation when set by this gradient (tan) is based on the following formulae:

$$\cos \theta = 1/\mathit{sqrt}(1+\tan \theta * \tan \theta)$$

$$\sin \theta = \cos \theta * \tan \theta$$

A value of the above set angle is calculated such as θ=arctan (sin θ/cos θ).

Further, contents stored in the memory at this stage are ΔX, ΔY, ΔZ, sin ΔA, cos ΔA, sin ΔB, cos ΔB, sin ΔC, cos ΔC.

Next, a shift about the axis A is effected, and a rotation by only (−A) is made, thereby obtaining coordinates which are to change (step S106). Note that a command value of A is generally negative, and, hence, (−A) takes a positive value. Further, the rotation (−A) is made in the counterclockwise direction as viewed from −X but in the clockwise direction (CW) as viewed from +X.

Herein, the central position of the axis A is given by Y=YA0, Z=ZA0, and the input unit is 0.0001 mm, wherein:

ZA0: A-axis central position Z-direction (which does not include a mechanical constant correction) (Quinaxial Control Lateral Type Machining Center BMC-80 (5) E made by Toshiba Machine Co., Ltd.: ZA0=100.000 mm) given to a post-processor, and YAO: A-axis central position Y-direction (which does not include the mechanical constant) (BMC-80 (5): YA0= 400.000 mm) given to the post processor.

Note that YA0, ZA0 and XB0, YB0, ZB0 which will be mentioned later are mechanical constants and take fixed values according to every machine type but are stored in the area 162 of the memory 160.

Hence,
X1=X
Y1=(Y−YA0) * cos A−(Z−ZA0) * sin A+YA0
Z1=(Y−YA0) * sin A+(Z−ZA0) * cos A+ZA0
U1=U
V1=V * cos A−W * sin A=−sin A
W1=V * sin A+W * cos A=cos A Thus, the values are obtained and stored in the memory.

next, a shift about the axis B is effected, and a rotation by only (−B) is made, thereby obtaining coordinates which are to change (step S107). As in the case of A-axis, (−B) takes a positive value.

The workpiece center on the B-axis when A=0 is given such as X=XB0, Y=YB0, Z=ZB0. Herein, YB0 changes depending on a workpiece mounted on the table. That is, as viewed from +Y, +B indicates a rotation in the direction CW, and =B indicates a rotation in the direction CCW.

(If the center is set at 100 mm on the table in the case of DMC-80 (5)E,
XB0=750.000 mm,
YB0=550.000 mm,
ZB0=250.000 mm.)
Accordingly,
X0=(Z1−ZB0) * sin B+(X1−XB0) * cos B+XB0
Y0=Y1
Z0=(Z1−ZB0) * cos B −(X1−XB0) * sin B+ZB0
U0=W1 * sin B+U1 * cos B=cos A * sin B
V0=V1=−sin A
W0=W1 * cos B=U1 * sin B=cos A * cos B Values are thus obtained. These values and those which will hereinafter be obtained and are all stored in the memory.

Subsequently, a pitching correction quantity ΔA is obtained (step S108). A direction of this error ΔA is opposite to the swivel base moving direction.

X2=XU
Y2=(Y0=YB0) * cos ΔA=(Z0=ZB0) * sin ΔA+YB0
Z2=(Y0=YB0) * sin ΔA+(Z0=ZB0) * cos ΔA+ZB0
U2=U0
V2=V0 * cos ΔA−W0 * sin ΔA
W2=V0 * sin ΔA+W0 * cos ΔA Next, a rolling correction quantity ΔC is obtained (step S109). A direction of this error ΔC is identical with the direction CCW as viewed from a Z+direction.

$X3=(X2-XB0) * \cos \Delta C-(Y2-YB0) * \sin \Delta C+XB0$
$Y3=(X2-XB0) * \sin \Delta C+(Y2=YB0) * \cos \Delta C+YB0$
$Z3=Z2$
$U3=Z2$
$U3=U2 * \cos \Delta C+V2 * \sin \Delta C$
$V3=-U2 * \sin \Delta C+V2 * \cos \Delta C$
$W3=W2$ Next, a yawing correction quantity $\Delta B$ is obtained (step S110). A direction of this error $\Delta B$ is opposite to a table moving direction.

$X4=(Z3-ZB0) * \sin \Delta B+(X3-XB0) * \cos \Delta B+XB0$
$Y4=Y3$
$Z4=(Z3-ZB0) * \cos \Delta B-(X3-XB0) * \sin \Delta B+XB0$
$U4=W3 * \sin \Delta B+U3 * \cos \Delta B$
$V4=V3$
$W4=W3 * \cos \Delta B-U3 * \sin \Delta B$ Next, correction quantities in the rectilinear direction are obtained (step S111).

$X5=X4+\Delta X$
$Y5=Y4+\Delta Y$
$Z5=Z4+\Delta Z$
$U5=U4$
$V5=V4$
$W5=W4$

These correction quantities are quivalent to a sum of all the correction quantities given so far.

Subsequently, Bx is obtained (step S112).

$Bx=\arctan (U5/W5)$
$\sin Bx=\sin (Bx), \cos Bx=\cos (Bx)$

Based on these values, a rotation corresponding to (bx) is made (step S113).

$X6=(X5-XB0) * \cos Bx-(Z5-ZB0) * \sin Bx+XB0$
$Y6=Y5$
$Z6=(X5-XB0) * \sin Bx+(Z5-ZB0) * \cos Bx+ZB0$
$U6=U5 * \cos Bx-W5 * \sin Bx=0$
$V6=V5$
$W6=U5 * \sin Bx+W5 * \cos Bx$ The numerical values U, V, W at the respective stages described above, the values U, V, W, X, Y, Z that are suffixed with 0–6, a variety of sin and cos values and the values Bx, etc. are stored in a transient memory area 164, used for the arithmetic operation, of the memory 160.

Subsequently, Ax is obtained (step S114).

$Ax=-\arctan (V6/W6)$
$\sin Ax=\sin (Ax), \cos Ax=\cos (Ax)$

Finally, at the actual A-axis center, a rotation corresponding to (Ax) is made, and, simultaneously, the mechanical constant correction is also performed (step S113). The input unit is set to 0.0001 mm, and the A-axis central position is given such as Y=YAM, Z=ZAM, wherein ZAM: actual machine A-axis central position Z-direction (mechanical constant corrected value), and YAM: actual machine A-axis central position Y-direction (mechanical constant corrected value).

These two values are measured when completing the machine and performing the periodic maintenance and inspection but held in the area 163 of the memory 160.

Finally, corrected one-block command values are obtained in accordance with the following formulae:

$Xx=X6$
$Yx=(Z6-ZAM) * \sin aX+(Y6-YAM) * \cos Ax+YAM$
$Zx=(Z6-ZAM): \cos aX-(Y6-YAM) * \sin Ax+ZAM$
$Ux=U6$
$Vx-W6 * \sin Ax+V6 * \cos Ax=0$
$Wx=W6: \cos Ax-V6 * \sin Ax=1$ These values are stored in an area 165 of the memory 160. Based on these values, the CPU 110 issues a command to the servo drive unit 20, thereby driving the machine body 10.

Note that above-described fixture offset correction includes the conventional mechanical constant correcting functions (G571, G581), and hence there is not necessity for changing the program such as a change in G codes.

As discussed above, according to the present invention, even if the mounting errors exist not only in the three directions X, Y, Z but also in the three rotation degree-of-freedom directions of the yawing, rolling and the pitching, the machining can be performed by properly correcting these errors. Therefore, even in the simultaneous quinaxial control machining wherein a turning angle of the workpiece is varied during the machining, the fixture offset correction can be accurately carried out.

It is apparent that, in this invention, a wide range of different working modes can be formed based on the invention without deviating from the spirit and scope of the invention. This invention is not restricted by its specific working modes except being limited by the appended claims.

What is claimed is:

1. A method of correcting an error in mounting a workpiece in a numerically controlled machine tool for performing simultaneous quinaxial control of said workpiece secured to a fixture secured on a table, said method comprising steps of:

determining first positions and first directions of a tool based upon command numerical values;

measuring actual positions of said workpiece relative to said table;

obtaining second positions and second directions for said tool with respect to a point of said workpiece according to differences between said command numerical values and said actual positions and said first directions, said second positions and said second directions being obtained in a step by step manner by changing coordinates and axes to be corrected; and obtaining quinaxial coordinate values satisfying said second positions and said second directions of said tool; and giving a numerical control command to driving means of each of said axes based on said quinaxial coordinate values.

2. The method according to claim 1, further comprising steps of:

determining whether said coordinates change when one of said axes is to be rotated; and maintaining former coordinate values if no change of said coordinates is determined.

3. The method according to claim 1, wherein said method of correcting said error in mounting said workpiece is performed for every portion of said workpiece.

4. An apparatus for correcting an error in mounting a workpiece in a numerically controlled machine tool for performing simultaneous quinaxial control of said workpiece secured to a fixture secured on a table, said apparatus comprising:

storing means for storing command numerical values for a tool;

attitude detecting means for detecting positions of said workpiece and directions of said workpiece relative to said table;

means for obtaining positions and directions for said tool with respect to a point of said workpiece according to differences between said command numerical values and said actual positions and said directions of said workpiece relative to said table, said positions and directions for a tool being obtained in a step-by-step manner by changing coordinates and axes to be corrected; and means for obtaining quinaxial coordinate values satisfying said positions and said directions of said tool; and command means for giving a numerical control command to driving means of each of said axes based on said quinaxial coordinate values.

5. The apparatus according to claim 4, further comprising:
a machine tool including:
   a machine body;
   a plurality of drive motors attached to said machine body; and
   a sensor attached to said machine body, wherein said attitude detecting means is said sensor.

* * * * *